United States Patent [19]
Song et al.

[11] Patent Number: 6,146,754
[45] Date of Patent: Nov. 14, 2000

[54] SUBSTANTIALLY ISOTROPIC MAGNETIC RECORDING MEDIUM COMPRISING A SEEDLAYER

[75] Inventors: Xing Song, Mountain View; Qixu Chen, Milpitas; Charles Leu, Fremont; Rajiv Yadav Ranjan, San Jose, all of Calif.

[73] Assignee: Seagate Technology, Inc., Scotts Valley, Calif.

[21] Appl. No.: 09/145,762

[22] Filed: Sep. 2, 1998

Related U.S. Application Data

[60] Provisional application No. 60/058,240, Sep. 8, 1997.

[51] Int. Cl.$^7$ .......................................... G11B 5/66
[52] U.S. Cl. ...................... 428/332; 428/336; 428/694 T; 428/694 TS; 428/394 TP; 428/900; 427/128; 427/129; 427/130; 427/131
[58] Field of Search .......................... 428/694 T, 694 TS, 428/694 TP, 900, 332, 336; 427/128–131

[56] References Cited

U.S. PATENT DOCUMENTS

| | | | |
|---|---|---|---|
| 5,302,434 | 4/1994 | Doerner | 428/64 |
| 5,456,978 | 10/1995 | Lal et al. | 428/332 |
| 5,569,533 | 10/1996 | Lal et al. | 428/332 |
| 5,866,227 | 2/1999 | Chen | 428/65.3 |

OTHER PUBLICATIONS

Lee, Li–Lien et al., "FeAl underlayers for CoCrPt thin film longitudinal media", 41$^{st}$ Annual Conference on Magnetism & Magnetic Materials, Nov. 1996, pp. 1–8.

Laughlin, David E. et al., "The Control and Characterization of the Crystallographic Texture of Longitudinal Thin Film Recording Media", IEEE Transactions on Magnetics, vol. 32, No. 5, Sep. 1996, pp. 3632–3637.

Lee, Li–Lien et al., "Seed layer induced (002) crystallographic texture in NiAl underlayers", J. Appl. Phys. vol. 79, No. 8, Apr. 15, 1996, pp. 4902–4904.

Lee, Li–Lien et al., "Effects of Cr Intermediate Layers on CoCrPt Thin Film Media on NiAl Underlayers", IEEE Transactions on Magnetics, vol. 31, No. 6, Nov. 1995, pp. 2728–2730.

Lee, Li–Lien et al., "NiAl Underlayers For CoCrTa Magnetic Thin Films", IEEE Transactions on Magnetics, vol. 30, No. 6, Nov. 1994, pp. 3951–3953.

*Primary Examiner*—Leszek Kiliman
*Attorney, Agent, or Firm*—McDermott, Will & Emery

[57] ABSTRACT

A high areal density magnetic recording medium exhibiting high Hc, high SNR, high S* and substantially isotropic magnetic properties is achieved by depositing a thin seedlayer before depositing the underlayer. Embodiments include heating the seedlayer under vacuum in the presence of residual oxygen to induce appropriate crystalline orientation and surface morphology for nucleation and growth of the underlayer and magnetic layer having substantially isotropic magnetic properties.

19 Claims, 9 Drawing Sheets

SUBSTANTIALLY ISOTROPIC MAGNETIC RECORDING MEDIUM COMPRISING A SEEDLAYER

RELATED APPLICATIONS

This application claims priority from provisional patent application Serial No. 60/058,240 filed Sep. 8, 1997, entitled "High Coercivity, Low Noise Magnetic Thin Film Media With A CrOx Seedlayer", the entire disclosure of which is hereby incorporated herein by reference.

This application contains subject matter similar to the subject matter of copending application Ser. No. 09/149,096, filed on Sep. 8, 1998 now pending.

TECHNICAL FIELD

The present invention relates to a magnetic recording medium, such as a thin film magnetic recording disk, and to a method of manufacturing the medium. The invention has particular applicability to a high areal density magnetic recording media exhibiting low noise, high coercivity and high overwrite.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

Figure 1:
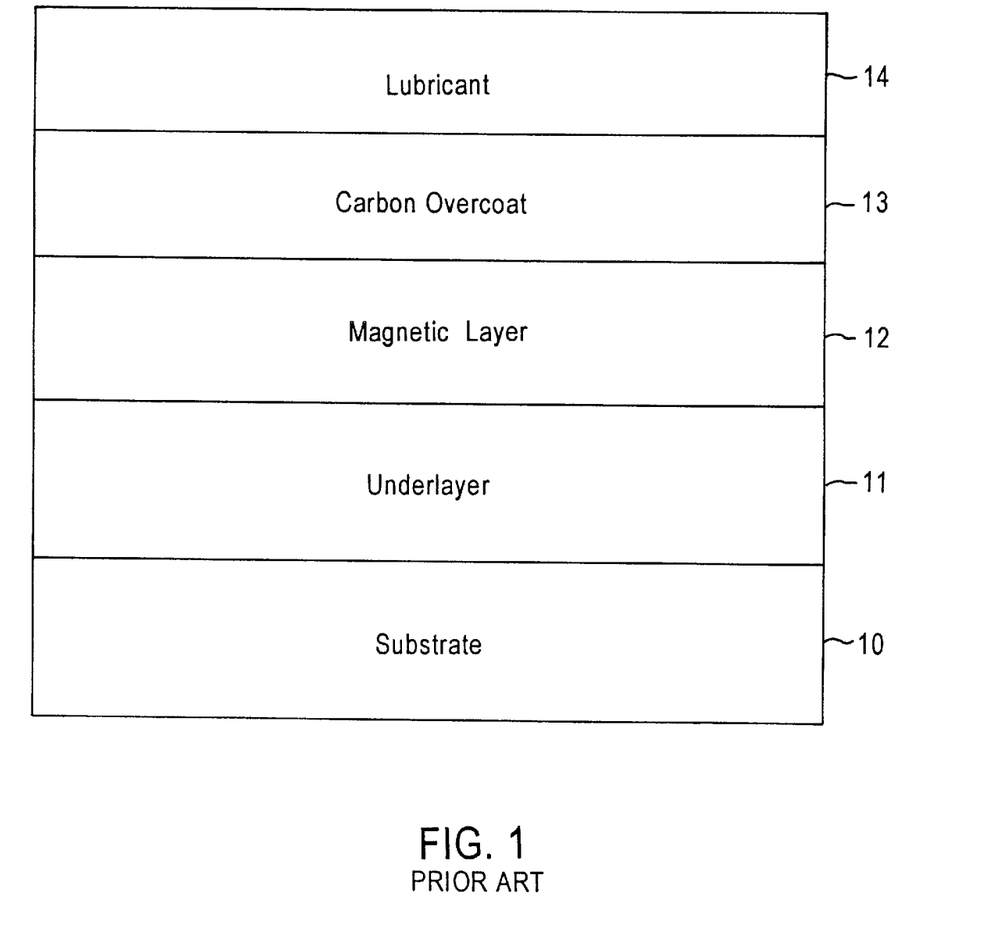
FIG. 1 schematically depicts a conventional magnetic recording medium structure.

A conventional longitudinal recording disk medium is depicted in FIG. 1 and typically comprises a non-magnetic substrate 10 having sequentially deposited thereon an underlayer 11, such as chromium (Cr) or a Cr-alloy, a magnetic layer 12, typically comprising a cobalt (Co) alloy, a protective overcoat 13, typically containing carbon, and a lubricant topcoat 14. Underlayer 11, magnetic layer 12 and protective overcoat 13 are typically deposited by sputtering techniques. The Co alloy magnetic layer normally comprises polycrystallites epitaxially grown on the polycrystal Cr or Cr-alloy underlayer.

It is recognized that the relevant magnetic properties, such as coercivity (Hc), magnetic remanence (Mr) and coercive squareness (S*), which are critical to the performance of a Co base alloy magnetic thin film, depend primarily on the microstructure of the magnetic layer which, in turn, is influenced by the underlayer on which it is deposited. Conventional underlayers include Cr, molybdenum (Mo), tungsten (W), titanium (Ti), chromium-vanadium (CrV) as well as Cr alloyed with various substitutional elements. It is recognized that underlayers having a fine grain structure are highly desirable, particularly for growing fine grains of hexagonal close packed (HCP) Co alloys deposited thereon.

It has been reported that nickel-aluminum (NiAl) films exhibit a grain size which is smaller than similarly deposited Cr films which are the underlayer of choice in producing conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994.

Figure 2:
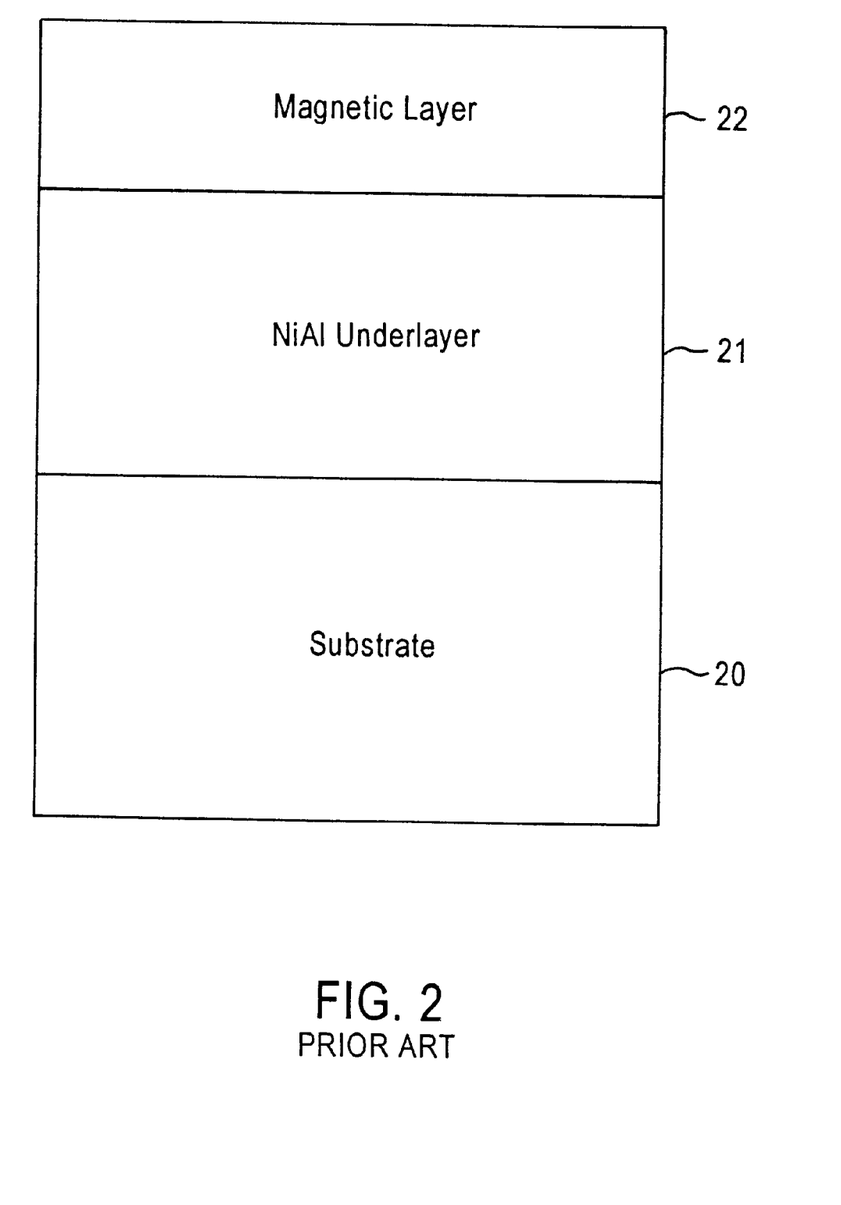
FIG. 2 schematically depicts a prior art magnetic recording medium containing an NiAl underlayer.

Accordingly, NiAl thin films are potential candidates as underlayers for magnetic recording media for high density longitudinal magnetic recording. Such a magnetic recording medium is schematically depicted in FIG. 2 and comprises glass substrate 20, NiAl underlayer 21 and cobalt alloy magnetic layer 22 (protective overcoat and lubricant topcoat omitted for illustrative convenience). However, it was found that the coercivity of a magnetic recording medium comprising an NiAl underlayer, such as that depicted in the FIG. 2, is too low for high density recording, e.g. about 2,000 Oersteds (Oe).

Lee et al. subsequently reported that the coercivity of a magnetic recording medium comprising an NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, November 1995, pp. 2728–2730. Such a magnetic recording medium comprising an alternative NiAl layer and Cr layer composite structure is schematically illustrated in FIG. 3.

Figure 3:
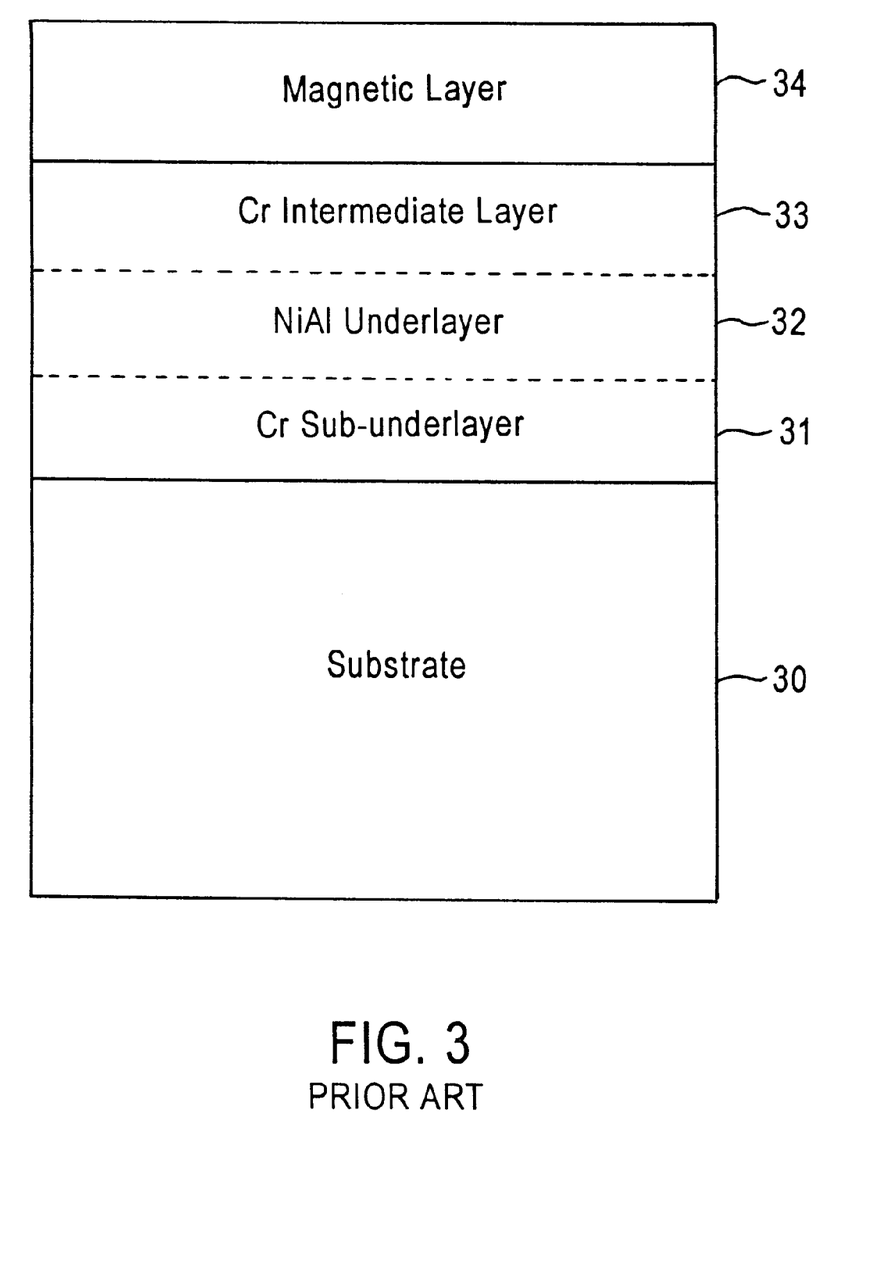
FIG. 3 schematically depicts a prior art magnetic recording medium comprising a composite NiAl/Cr underlayer structure.

Adverting to FIG. 3, the depicted magnetic recording medium comprises glass substrate 30 having sequentially formed thereon Cr sub-underlayer 31, NiAl underlayer 32, Cr intermediate layer 33, and Co alloy magnetic layer 34 (protective overcoat and lubricant topcoat omitted for illustrative convenience). It was found, however, that such a magnetic recording medium is characterized by an underlayer structure exhibiting a (110)-dominant crystallographic orientation which does not induce the preferred (11 2̄0)-dominant crystallographic orientation in the subsequently deposited Co alloy magnetic layer and is believed to contribute to increased media noise.

Li-Lien Lee et al. were able to obtain an underlayer exhibiting a (200)-dominant crystallographic orientation by initially depositing a Cr sub-underlayer directly on the non-magnetic substrate at an undesirably high temperature of about 260° C. using radio frequency (RF) sputtering. However, deposition of a Cr sub-underlayer at such an elevated temperature undesirably results in significantly larger grains than grains resulting from deposition at lower temperatures, e.g. approximating room temperature (25° C.). The formation of such larger grains is inconsistent with the very reason for employing NiAl as an underlayer. On the other hand, it is very difficult to obtain a Cr (200)-dominant crystallographic orientation, even at elevated temperature such as 260° C., on glass and glass ceramic substrates using direct current (DC) magnetron sputtering, which is widely employed in the magnetic recording media industry.

Li-Lien Lee et al. recognized the undesirability of resorting to high deposition temperatures to obtain a (200)-dominant crystallographic orientation in the underlayer structure. It was subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media,"

Figure 4:
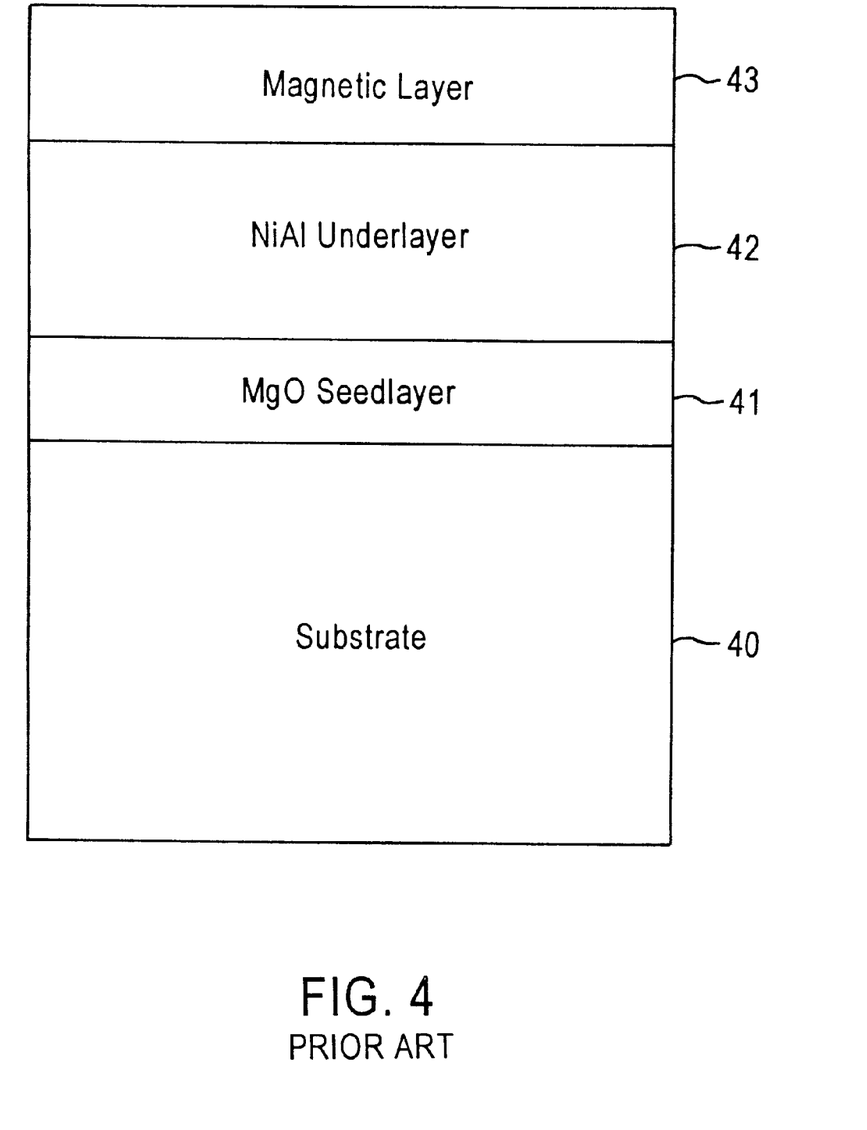
FIG. 4 schematically depicts a prior art magnetic recording medium comprising an NiAl underlayer and MgO seedlayer.

IEEE Transactions on Magnetics, Vol. 32, No. 5, September 1996, pp. 3632–3637. Such a magnetic recording medium comprising a MgO seedlayer and NiAl underlayer is schematically illustrated in FIG. 4 and comprises MgO seedlayer 41 deposited on substrate 40, NiAl underlayer 42 deposited on MgO seedlayer 41, and Co alloy magnetic layer 43 deposited on NiAl underlayer 42 (protective overcoat and lubricant topcoat omitted for illustrative convenience). Such a magnetic recording medium, however is not commercially viable from an economic standpoint, because sputtering systems in place throughout the industry making magnetic recording media with the conventional structure of magnetic layers epitaxially formed on underlayers are based upon direct current (DC) sputtering. Accordingly, RF sputtering an MgO seedlayer is not economically viable.

On the other hand, the objective of having a (200)-dominant crystallographic orientation in the underlayers is to induce ($11\bar{2}0$) crystallographic orientation in the Co alloy layers. Even through media comprising an MgO seedlayer and NiAl underlayer have a (200)-dominant crystallographic orientation in the underlayer, it does not have a ($11\bar{2}0$)-dominant crystallographic orientation in the Co alloy layer, according to Laughlin et al., "The Control and Characterization of the Crystallographic Texture of the Longitudinal Thin Film Recording Media," IEEE Transaction on Magnetics, Vol. 32, No. 5, September 1996, p. 3634. Laughlin et al. reported that the grain-to-grain epitaxial relationship between the (002) NiAl and the CoCrPt film is found to be [$10\bar{1}1$] CoCrPt//[001] NiAl, and ($12\bar{1}0$) CoCrPt//(100) NiAl, or ($12\bar{1}0$) CoCrPt//(010) NiAl. In other words, Laughlin et al. reported that there is no ($11\bar{2}0$) CoCrPt//(200) NiAl epitaxial relationship found in the films with MgO seedlayers and NiAl underlayers. Rather, (200) orientation is identical with (002) orientation. When an FeAl underlayer is used instead of NiAl, it was reported that the (200) FeAl underlayer can only induce a weak ($11\bar{2}0$) textured CoCrPt by employing a MgO seedlayer or a (200) textured Cr seedlayer. Li-Lien Lee et al., "FeAl underlayers for CoCrPt thin film longitudinal media," CC-01, 41st Annual Conference on Magnetism and Magnetic Materials, Atlanta, Ga., Nov. 12–15, 1996.

Lal et al., U.S. Pat. No. 5,456,978 and Lal et al., U.S. Pat. No. 5,569,533 disclose magnetic recording media comprising a Cr sublayer on a substrate with a Cr-based underlayer deposited thereon. Co-pending application Ser. No. 08/735,443, filed on Jan. 2, 1997, now U.S. Pat. No. 5,879,783, issued Mar. 9, 1999, discloses that Cr films deposited on surface oxidized NiP layers experience smaller grains than Cr films deposited on non-oxidized NiP layers. Co-pending application Ser. No. 08/586,529, filed on Jan. 16, 1996, now U.S. Pat. No. 5,733,370, issued Mar. 31, 1998, discloses a method for depositing Cr films on surface oxidized NiP films, wherein the deposited Cr films exhibit a (200)-dominant crystallographic orientation. In copending application Ser. No. 08/945,084, filed on Oct. 17, 1997, now U.S. Pat. No. 6,010,795, issued Jan. 4, 2000, a magnetic recording medium is disclosed which comprises a surface oxidized NiP seedlayer, a Cr sub-underlayer thereon, a NiAl or FeAl underlayer formed on the sub-underlayer and a Cr or Cr alloy intermediate layer formed on the underlayer.

There exists a need for high areal density magnetic recording media exhibiting a high signal to noise ratio (SNR) and high coercivity. There is a further continuing need for such magnetic recording media which exhibit improved overwrite properties and reduced modulation of magnetic properties, and are characterized by the absence of any substantial superlinear noise behavior at high areal recording densities.

DISCLOSURE OF THE INVENTION

An object of the present invention is a magnetic recording medium for high areal recording density exhibiting low noise, high coercivity and substantial directional magnetic isotropy.

Another object of the present invention is a magnetic recording medium which exhibits excellent overwrite properties and is characterized by the absence of any substantial superlinear noise behavior at high areal recording densities.

Another object of the present invention is a method of manufacturing a magnetic recording medium for high areal recording density exhibiting low noise, high coercivity and substantial directional magnetic isotropy.

Another object of the present invention is a method of manufacturing a magnetic recording medium which exhibits excellent overwrite properties and is characterized by the absence of any substantial superlinear noise behavior at high areal recording densities.

Additional objects, advantages and other features of the invention will be set forth in part in the description which follows and in part will become apparent to those having ordinary skill in the art upon examination of the following only to be learned from the practice of the invention. The objects and advantages of the invention may be realized and obtained as particularly pointed out in the appended claims.

According to the present invention, the foregoing and other objects are achieved, in part by a magnetic recording medium comprising: a non-magnetic substrate; a seedlayer on the non-magnetic substrate; an underlayer on the seedlayer; and a magnetic layer on the underlayer; wherein the magnetic layer exhibits substantially directional magnetic isotropy.

Another aspect of the present invention is a method of manufacturing a magnetic recording medium, which method comprises: depositing a seedlayer on a non-magnetic substrate, wherein grains lying in a plane are randomly orientated; depositing an underlayer on the seedlayer; depositing a magnetic layer on the underlayer; wherein the magnetic layer exhibits substantially directional magnetic isotropy.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DESCRIPTION OF THE INVENTION

The present invention provides a magnetic recording medium suitable for high areal recording density exhibiting high Hc, high SNR and high S*. The magnetic recording media in accordance with embodiments of the present invention additionally advantageously exhibit substantial directional magnetic isotropy. Advantageously, a magnetic recording media in accordance with the present invention can be provided on any of various conventional substrates, such as glass, glass-ceramic, ceramic and NiP-coated Al substrates.

A conventional technique for achieving high SNR involves high substrate heating temperatures. However, the use of high substrate heating temperatures disadvantageously destroys the underlayer texture which, in turn, decreases the crystalline orientation of the magnetic layer. Moreover, thermal stresses associated with high substrate heating temperatures negatively impact tribological characteristics of a disk surface. For example, high substrate heating temperatures induce microcracking on the disk surface, including the laser textured landing zone which may lead to head crashes.

Conventional practices seek to control material selection and deposition conditions to obtain an underlayer exhibiting a (200)-dominant crystallographic orientation to induce a (11$\bar{2}$0)-dominant crystallographic orientation in the magnetic layer deposited and epitaxially grown thereon. However, in accordance with embodiments of the present invention, a seedlayer is employed, and the materials are selected and the deposition conditions controlled so that the subsequently deposited underlayer and magnetic layer do not exhibit any dominant crystallographic orientation. Thus, in accordance with embodiments of the present invention, the underlayer does not exhibit a (110)- or (200)-dominant crystallographic orientation and the magnetic layer does not exhibit a (11$\bar{2}$0)-dominant crystallographic orientation. Rather, the seedlayer is formed such that it contains grains lying in a plane which are randomly orientated. As a result, the magnetic layer exhibits substantial directional magnetic isotropy. Embodiments of the present invention include selecting materials and controlling deposition conditions to form a magnetic layer having magnetic properties with an orientation ratio (circumferential direction: radial direction) of less than about 1.1 even about 1.0.

The formation of a magnetic layer exhibiting substantial directional magnetic isotropy is advantageous in many respects. For example, a magnetic recording medium comprising a magnetic layer characterized by substantial directional magnetic isotropy exhibits significantly improved overwrite characteristics and significantly reduced magnetic property modulation, particularly significantly reduced Hc modulation in the circumferential direction. In addition, such substantial directional magnetic isotropy avoids any substantial nonlinear noise behavior at high recording densities.

In accordance with embodiments of the present invention, a desirably high SNR is achieved by the strategic formation of a seedlayer on the substrate prior to deposition of the underlayer and magnetic layer. After considerable experimentation and investigation, it was found that the nucleation, growth and crystallographic orientation of the magnetic layer can be suitably controlled by the proper selection of seedlayer and underlayer materials and, significantly, by suitable methodology. It was found that the seedlayer can be treated, after deposition, to adjust its crystalline orientation and surface morphology to induce the nucleation and growth of the underlayer and the magnetic layer such that the magnetic layer exhibits substantial directional magnetic isotropy. The resulting magnetic recording media exhibit excellent overwrite characteristics and do not exhibit any substantial modulation of magnetic properties. In addition, magnetic recording media in accordance with embodiments of the present invention do not exhibit any substantial superlinear noise behavior at high areal recording densities.

Embodiments of the present invention include deposition of a relatively thin seedlayer, such as a seedlayer having a thickness of about 5 Å to about 40 Å, e.g., about 15 Å to about 40 Å. It was found that the crystalline orientation and surface morphology of the seedlayer can be suitably optimized for inducing nucleation and growth of the underlayer and a magnetic layer resulting not only in increased SNR and high Hc, but also substantial directional magnetic isotropy. Embodiments of the present invention comprise heating the deposited seedlayer in a vacuum containing very small, i.e. residual amounts of oxygen, to form an oxidized surface layer, typically having a thickness up to about 20 Å and containing up to about 1 at. % oxygen, typically at a temperature of about 150° C. to about 250° C. Such heat treatment in the presence of residual oxygen has been found effective in modifying the surface morphology of the seedlayer for inducing substantial directional magnetic isotropy in the subsequently deposited magnetic layer. After considerable experimentation, it was also found that various magnetic properties, as well as the degree of directional magnetic isotropy, can be optimized or fine tuned by varying the thickness of the seedlayer.

The seedlayer employed in the present invention can be sputter-deposited and can comprise various materials, such as Cr, a Cr alloy, e.g., CrV, CrTi or CrTiB. After treatment of the seedlayer to modify the surface morphology for optimum magnetic directional isotropy, an underlayer, magnetic layer, carbon-protective overcoat and lubricant topcoat are sequentially deposited. The underlayer employed in the present invention can be sputter deposited at a thickness of about 300 Å to about 1500 Å and can comprise Cr, a Cr alloy, such as CrV, CrTi, CrTiB or Cr-Ta$_2$O$_5$. Other suitable underlayers include NiAl and FeAl. Multilayer underlayers can be employed in embodiments of the present invention, such as CrV/Cr, CrV/NiAl/Cr, or CrV/NiAl/Cr/Cr-Ta$_2$O$_5$.

The magnetic layers employed in the present invention can be any of those conventionally employed in the production of magnetic recording media. Embodiments of the present invention include the formation of dual magnetic layers, such as CoCrPtTa/CoCrTa, e.g., Co76Cr15Pt5Ta4/Co82Cr14Ta4.

Magnetic recording media in accordance with embodiments of the present invention are advantageously suitable for high areal recording density and exhibit a coercivity greater than about 3,000 Oe, e.g., greater than about 3,100 Oe, an S* of about 0.70 to about 0.90, and an SNR of about 19 to about 22 dB. The inventive magnetic recording media have magnetic properties with an orientation ratio (OR) less than about 1.1, e.g., about 1.0. The high isotropic performance of the inventive magnetic recording media is further characterized by a significant improvement in overwrite characteristics, the absence of substantial modulation of magnetic properties, such as coercivity in the circumferential direction, and the absence of any substantial superlinear noise behavior at high recording densities, e.g., about 220 kiloflux change per inch (KFCI) to about 280 KFCI.

In producing magnetic recording media in accordance with embodiments of the present invention it was found suitable to sputter deposit the seedlayer at a temperature of about 150° C. to about 300° C. at a pressure of about 3 to about 7 mTorr, e.g., about 5 mTorr. It was also found suitable to deposit the underlayer without elevating the deposition temperature, at a pressure of about 8 to about 12 mTorr, e.g., about 10 mTorr.

Figure 5:
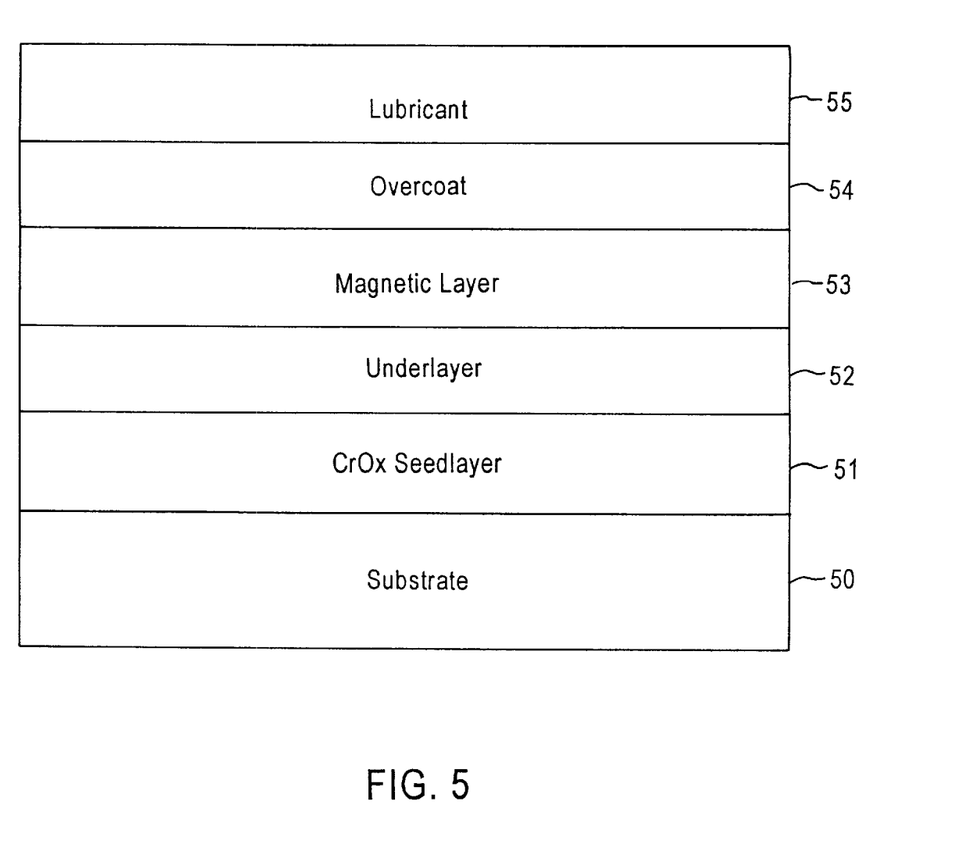
FIG. 5 schematically illustrates a magnetic recording medium in accordance with the present invention.
Figure 6:
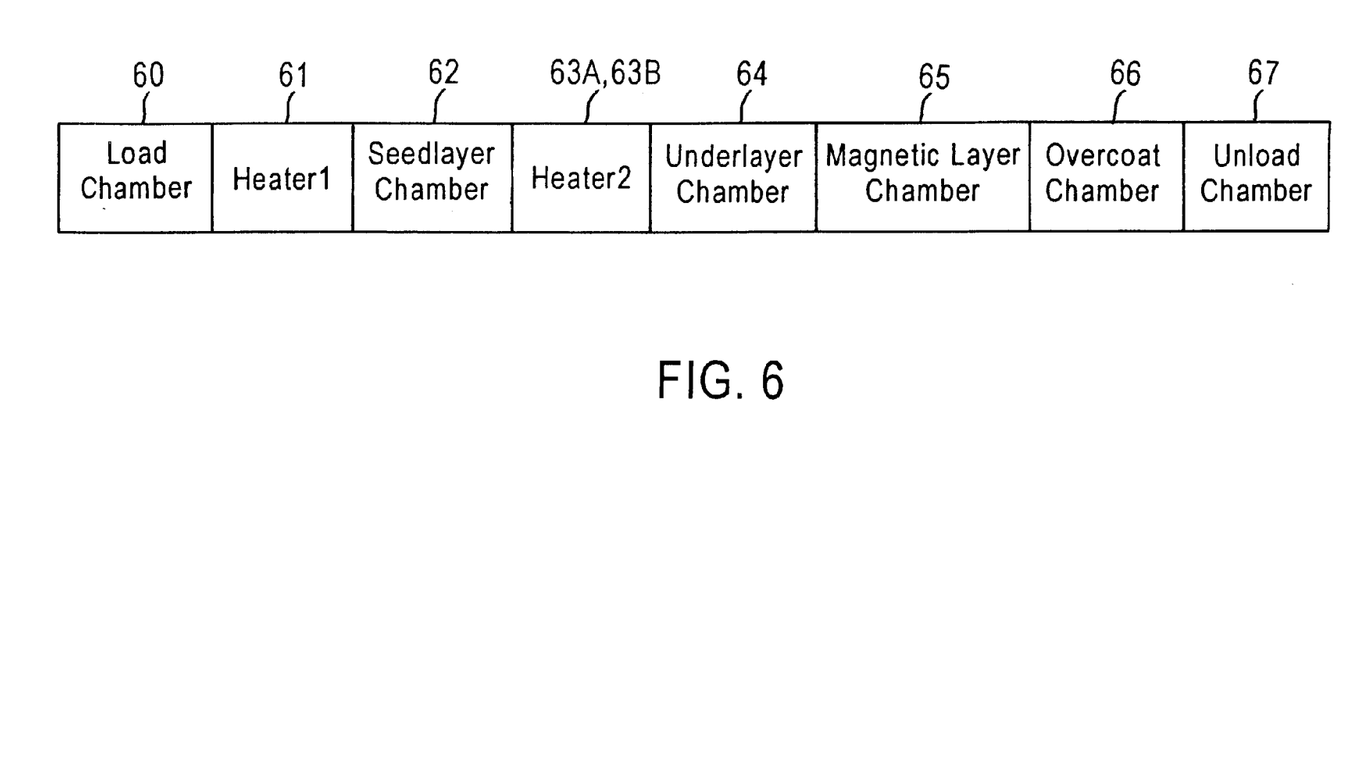
FIG. 6 schematically illustrates an in-line sputtering machine employed to fabricate magnetic recording media in accordance with the present invention.

A magnetic recording medium produced in accordance with the present invention is schematically illustrated in FIG. 5 and comprises substrate 50, a Cr seedlayer 51 containing up to about 1 at. % oxygen, an underlayer 52, magnetic layer 53, carbon-containing overcoat 54 and a lubricant topcoat 55. As in conventional practices, the seedlayer, underlayer, magnetic layer and overcoat can be sputter-deposited. Advantageously, embodiments of the present invention can be conducted employing conventional in-line sputtering apparatus. One such sputtering apparatus is schematically illustrated in FIG. 6 and comprises load chamber 60, first heating chamber 61, seedlayer deposition chamber 62, second heating chamber comprising stationary heater 63A and passby heater 63B, underlayer deposition chamber 64, magnetic layer deposition chamber 65, overcoat deposition chamber 66 and unload chamber 67.

As in conventional practices, a pallet is provided which accommodates multiple substrates. The pallet containing the substrates is introduced into the load chamber 60 (FIG. 6) and transferred to chamber 2 wherein it is heated. Subsequently, the pallet is conveyed to the seedlayer deposition chamber 62 wherein a thin seedlayer, e.g., Cr, is deposited directly on the substrate.

The pallet is then transferred to heating chamber comprising stationary heater 63A and passby heater 63B, wherein the surface morphology of the seedlayer is modified to induce substantial directional magnetic isotropy in the subsequently deposited magnetic layer. Such heating is conducted under a vacuum, e.g., about $5 \times 10^{-7}$ to about $9 \times 10^{-7}$ Torr. The temperature employed during such surface modification can be optimized in a particular situation, and depends upon, inter alia, the seedlayer material and thickness of the seedlayer. For example, it was found that a Cr seedlayer having a thickness of about 5 to about 40 Å can be heated at a temperature of about 150° C. to about 250° C. for up to one minute to effectively modify its surface morphology to induce substantial directional isotropy in the subsequently applied magnetic layer. It is not necessary to introduce oxygen to impact seedlayer surface morphology, since residual oxygen is usually present in conventional sputtering systems. Typically, the oxidized seedlayer surface does not contain more than about 1 at. % oxygen which is present in an oxidized surface layer having a thickness up to about 20 Å.

After modification of the surface morphology of the seedlayer, the pallet is transferred to chamber 64 wherein the underlayer is deposited, advantageously without the applications of heat. The pallet is then transferred to chamber 65 wherein the magnetic layer is deposited, then to chamber 66 wherein the protective overcoat is deposited. The resulting magnetic recording medium is transferred to unload chamber 67 and removed for application of a lubricant topcoat.

EXAMPLE

Six sample media were prepared in an in-line production sputtering apparatus, similar to that schematically illustrated in FIG. 6, employing the conditions appearing in Table I.

TABLE I

|  | Ht1 | Ht2 | Ht3 | Cr(SL) | Cr(UL) | CrV(UL) | Co82Cr 14Ta4 | Co76Cr 15Pt5Ta4 |
| --- | --- | --- | --- | --- | --- | --- | --- | --- |
| Chamber | 61 | 63A | 63B | 62 | 64 | 64 | 65 | 65 |
| Pair of Target | NA | NA | NA | 1 | 1 | 2 | 1 | 1 |
| Speed (fpm) | NA | NA | 6 | 7 | 14.6 | 14.6 | 14.6 | 6.6 |
| Gas Pressure | NA | NA | NA | 5 mTorr | 10 mTorr | 10 mTorr | 10 mTorr | 10 mTorr |
| Time (s) | 15 | 20 | NA | NA | NA | NA | NA |  |
| High Power | 10, 10, 10, 10% | 5, 13, 14, 7% | 26, 27, 30, 10% | 0–1.3 KW | 7 KW | 7 KW | 1.3 KW | 7.5 KW |
| Idle Power | 10, 10, 10, 10% | 5, 30, 32, 11% | 6, 6, 6, 6% | 0.15 KW | 0.15 KW | 0.15 KW | 0.15 KW | 0.15 KW |

In Table I above: Ht1, Ht2 and Ht3 denote heater 1, heater 2 and heater 3, respectively; Cr(SL) denotes Cr seedlayer; Cr(UL) denotes Cr underlayer; and CrV(UL) denotes CrV underlayer.

Each sample disk was prepared with a dual magnetic layer of Co76Cr15Pt5Ta4/Co82Cr14Ta4 having an Mrt (Mr× thickness) of about 0.78 memu/cm$^2$, a dual underlayer of CrV/Cr with a thickness of about 350 Å and a Cr seedlayer containing up to about 1 at. % oxygen. The corresponding layers of each sample disk were deposited under substantially the same conditions, except that the thickness of the Cr seedlayer was varied. The relevant properties of the samples were measured and analyzed.

Figure 7:
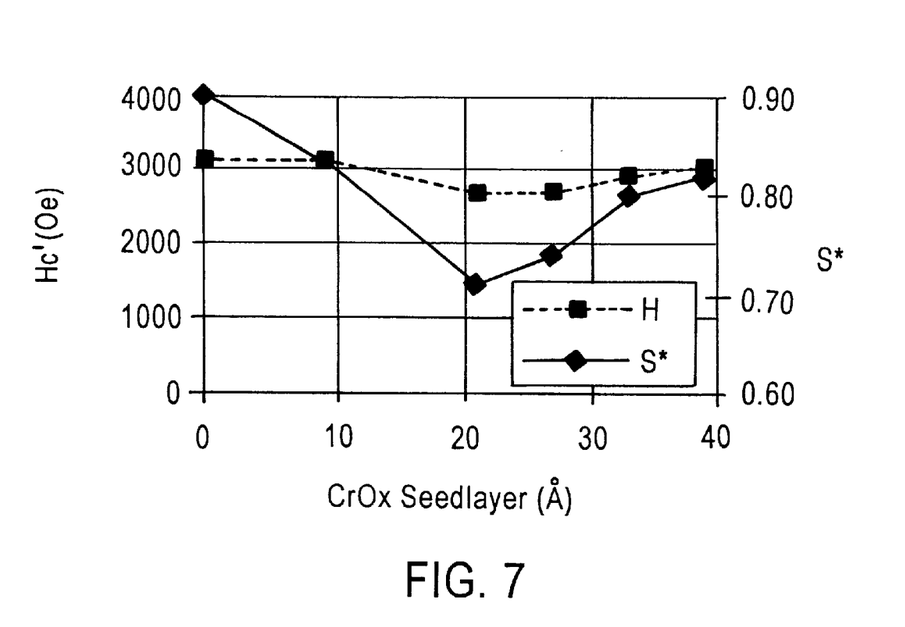
FIG. 7 is a graph showing the variation in Hc and S* with seedlayer thickness in accordance with an embodiment of the present invention.

The S* and Hc of each disk were measured and plotted in FIG. 7 as a function of seedlayer thickness. It is apparent that the value of S* and Hc change with seedlayer thickness. For example, S* drops from about 0.90 to about 0.85 at a seedlayer thickness of about 10 Å, and then drops to about 0.70 at a seedlayer thickness of about 20 Å. As the seedlayer increases to a thickness of about 30 Å to about 40 Å, S* increases to about 0.80 to about 0.83. The data further indicate that the Hc is greater than about 3,100 Oe until the seedlayer thickness is about 20 Å, when an Hc drop of several hundred is observed. As the seedlayer thickness increases, Hc increases. At a seedlayer thickness of about 40 Å, Hc is greater than about 3,000 Oe.

Figure 8:
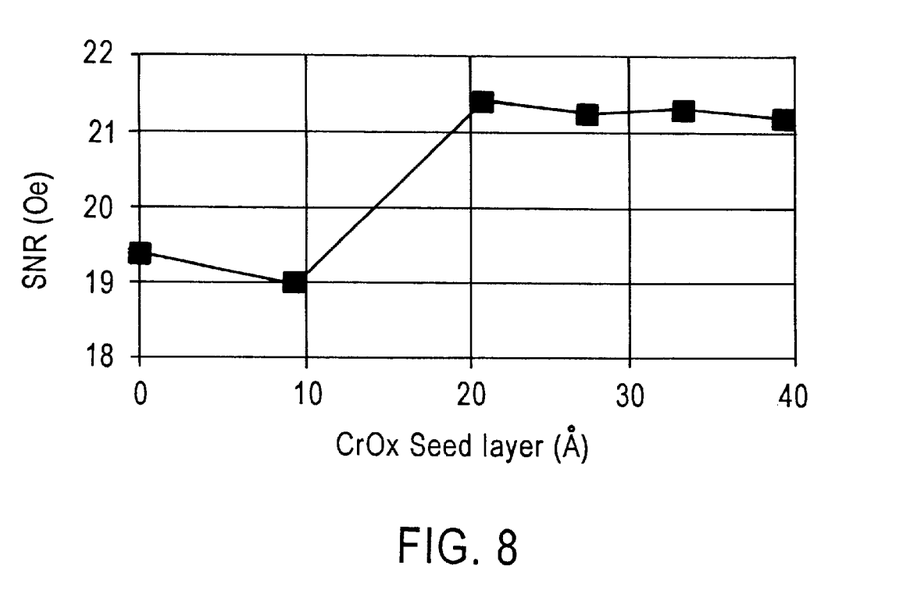
FIG. 8 is a graph showing the variation in Hc and SNR as a function of seedlayer thickness in accordance with an embodiment of the present invention.

The data reported in FIG. 8 was obtained with a 1701 Guzik tester employing a disk rotating speed of about 4200 rpm, a linear density of about 240 KFCI and a write current of about 40 mA. As shown in FIG. 8, a seedlayer thickness greater than 15 Å results in an increase in the SNR of about 2 dB.

Figure 9:
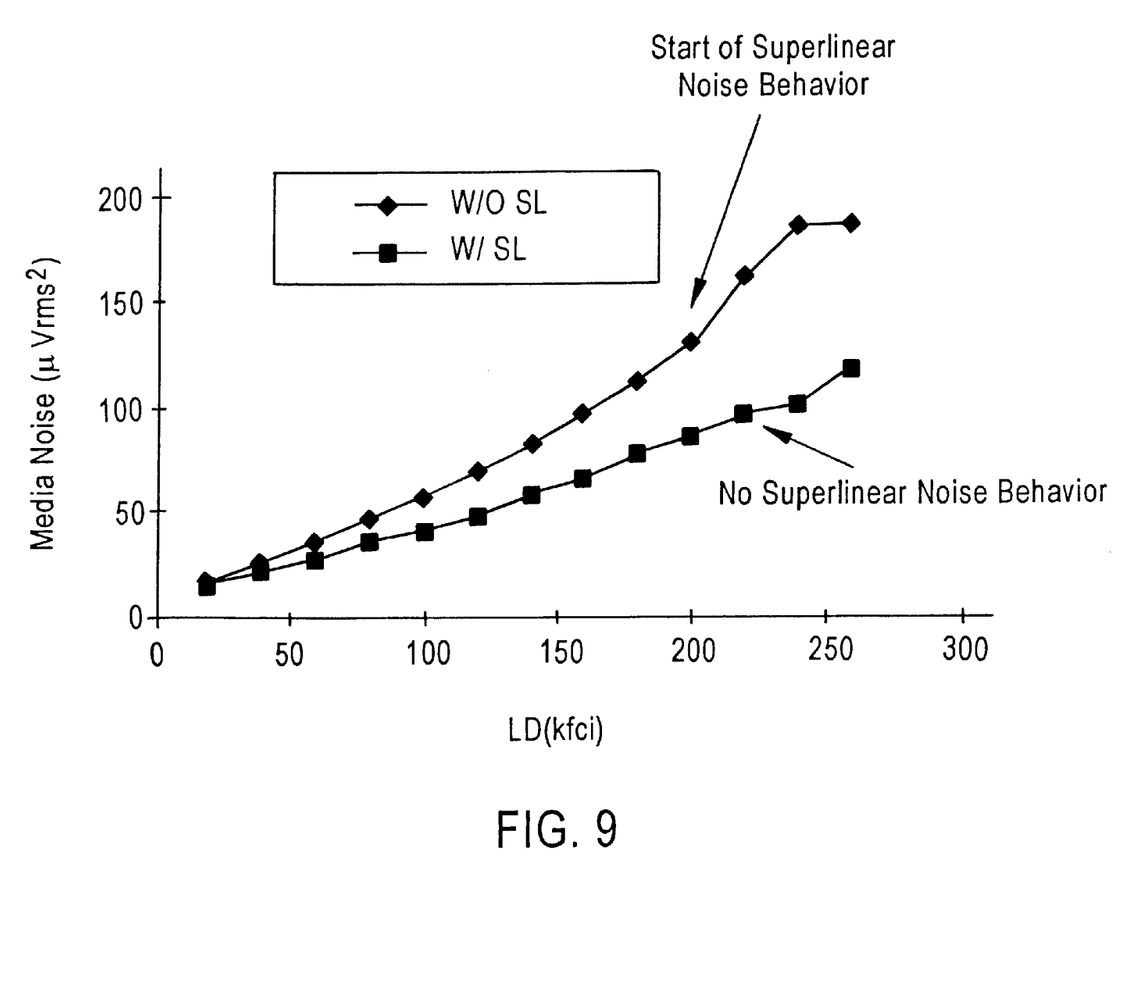
FIG. 9 is a graph showing the absence of any substantial superlinear noise behavior at high areal recording densities in accordance with an embodiment of the present invention.

Advantageously, the magnetic recording media in accordance with embodiments of the present invention do not exhibit any substantial superlinear noise behavior at high recording densities. In testing performed on two magnetic recording media produced in substantially the same manner except for the presence of a seedlayer, the inventive magnetic recording medium of the present invention was characterized by the absence of any substantial superlinear noise behavior at high recording densities, e.g., in excess of 220 KFCI, as shown in FIG. 9, with LD denoting linear density.

The exact mechanism involved in achieving substantial directional magnetic isotropy in accordance with the present invention is not known with certainty. It is, however, believed that the surface morphology is advantageously modified by suitable heat treatment in the presence of a trace amount of oxygen to form a surface morphology which induces substantial directional magnetic isotropy in the subsequently deposited magnetic layer.

Figure 10:
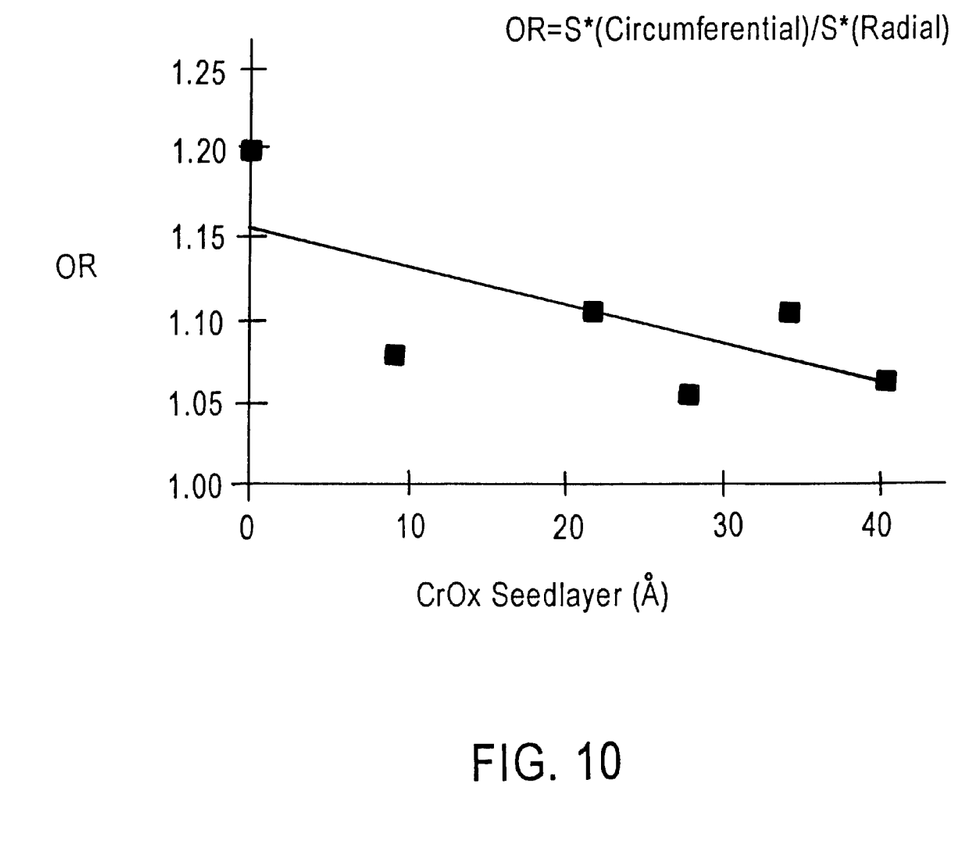
FIG. 10 is a graph illustration substantial directional magnetic isotropy as a function of seedlayer thickness in accordance with an embodiment of the present invention.

Table II contains data comparing Sample A without a seedlayer and Sample B produced in accordance with the present invention containing a seedlayer. Sample A and Sample B were otherwise prepared employing substantially the same materials and processed in substantially the same manner. It should be apparent from Table II that the orientation ratio of the magnetic properties of Sample B is significantly lower than those of Sample A.

tion ratio is somewhat dependent upon the thickness of the seedlayer, as shown in FIG. 10. Thus, the present invention advantageously enables control of the orientation ratio, as well as fine tuning the magnetic properties, i.e., Hc, S* and SNR, by optimizing the thickness of the seedlayer.

The present invention provides high areal density magnetic recording media having a high Hc, e.g., above 3,000 Oe, including above 3,100 Oe, with an increased SNR. Magnetic recording media in accordance with embodiments of the present invention exhibit substantial directional magnetic isotropy, e.g., magnetic properties with an orientation ratio of less than about 1.1, including an orientation ratio of about 1.0, improved overwrite characteristics, significantly reduced magnetic property modulation and are characterized by the absence of any substantial nonlinear noise behavior at high recording densities. The underlayer formed in accordance with the present invention does not exhibit any dominant crystallographic orientations, e.g., a (110)- or (200)-dominant crystallographic orientation, and the magnetic layer, similarly, does not exhibit any dominant crystallographic orientations, e.g., a $(11\bar{2}0)$ dominant crystallographic orientation.

The substrates employed in the present invention can advantageously comprise any of various substrates conventionally employed in the manufacture of magnetic recording media, including Al alloy substrates with NiP coatings, various glass, ceramic or glass-ceramic materials.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any

TABLE II

| Sample | Hr(cir) | Hr(rad.) | OR(Hr) | mr(cir.) | mr(rad.) | OR(mr) | S*(cir.) | S*(rad.) | OR(S*) |
|---|---|---|---|---|---|---|---|---|---|
| A | 3233 | 2744 | 1.18 | 5.80 | 3.58 | 1.62 | 0.80 | 0.72 | 1.22 |
| B | 2965 | 2801 | 1.06 | 4.96 | 4.26 | 1.16 | 0.80 | 0.75 | 1.07 |

In Table II above: Hr(cir.) denotes remanent coercivity measured along the circumferential direction of the disc; Hr(rad.) denotes remanent coercivity measured along the radial direction of the disc; OR(Hr)=Hr(cir.)/Hr(rad.) denotes the orientation ratio of Hr; Mr(cir.) denotes remanent moment measured along the circumferential direction of the disc; Mr(rad.) denotes remanent moment measured along the radial direction of the disc; OR(Mr)=Mr(cir.)/Mr(rad.) denotes the orientation ratio of Mr; S*(cir.) denotes remanent coercivity squareness measured along the circumferential direction of the disc; S*(rad.) denotes remanent coercivity squareness measured along the radial direction of the disc; and OR(S*)=S*(cir.)/S*rad.) denotes the orientation ratio of S*.

During further testing, it was found that a magnetic recording medium comprising a seedlayer in accordance with the present invention exhibited an increase in overwrite of about 3.6 dB vis-à-vis a similar magnetic recording medium without the seedlayer. It was also found during further experimentation and investigation that the orientaconventional means, such as sputtering. Protective overcoats can comprise zirconium oxide ($ZrO_2$) carbon, including hydrogenated carbon, silicon carbide (SiC), or a carbon nitride (CN). The protective overcoat is provided in a thickness suitable to protect the underlying layers. An overcoat having a thickness of about 50 Å to about 300 Å, such as about 100 Å to 200 Å has been found suitable.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

The present invention is not limited to the specific examples disclosed herein or the particular materials previously exemplified or mentioned. The magnetic recording media of the present invention enjoy utility in various applications, particularly applications wherein high density is required, such as a magnetic rigid disk medium for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising:

a non-magnetic substrate;

a chromium or chromium alloy seedlayer on the non-magnetic substrate;

an underlayer on the seedlayer; and a magnetic layer on the underlayer; wherein the magnetic layer exhibits substantially directional magnetic isotropy.

2. The magnetic recording medium according to claim 1, wherein the seedlayer comprises an oxidized surface containing up to about 1 at. % oxygen.

3. The magnetic recording medium according to claim 2, wherein the seedlayer has a thickness of about 5 Å to about 40 Å and an oxidized surface with a thickness up to about 20 Å.

4. The magnetic recording medium according to claim 3, having magnetic properties with an orientation ratio less than about 1.1.

5. The magnetic recording medium according to claim 4, characterized by the absence of any superlinear noise behavior at a recording density of about 220 KFCI to about 280 KFCI.

6. The magnetic recording medium according to claim 1, wherein the underlayer comprises chromium or a chromium-alloy.

7. The magnetic recording medium according to claim 6, comprising a multilayer underlayer.

8. The magnetic recording medium according to claim 7, wherein:

the seedlayer comprises chromium and has an oxidized surface containing up to about 1 at. % oxygen; and the underlayer is a composite underlayer comprising a chromium-vanadium layer on a chromium layer.

9. The magnetic recording medium according to claim 8, wherein the magnetic layer comprises a cobalt-chromium-platinum-tantalum alloy layer on a cobalt-chromium-tantalum alloy layer.

10. The magnetic recording medium according to claim 1, wherein the magnetic layer exhibits a hexagonal close packed crystal structure with randomly oriented grains, and the magnetic recording medium is characterized by the absence of any substantial superlinear noise behavior at a recording density of about 220 KFCI to about 280 KFCI and exhibits an S* of about 0.70 to about 0.90, an $H_c$ greater than about 3,000 $O_e$.

11. The magnetic recording medium according to claim 1, wherein:

the underlayer does not exhibit a (200)-dominant crystallographic orientation; and the magnetic layer does not exhibit a (11$\bar{2}$0)-dominant crystallographic orientation.

12. The magnetic recording medium according to claim 10, having magnetic properties with an orientation ratio of about 1.0.

13. A method of manufacturing a magnetic recording medium, which method comprises:

depositing a chromium or chromium alloy seedlayer on a non-magnetic substrate, wherein the grains lying in a plane are randomly oriented;

depositing an underlayer on the seedlayer; and depositing a magnetic layer on the underlayer; wherein the magnetic layer exhibits substantially directional magnetic isotropy.

14. The method according to claim 13, comprising oxidizing the seedlayer to form an oxidized surface layer containing less than about 1 at. % oxygen.

15. The method according to claim 14, comprising oxidizing the seedlayer to form an oxidized surface having a thickness up to about 20 Å.

16. The method according to claim 15, comprising heating the seedlayer at a temperature of about 150° C. to about 250° C. at a pressure of about 5×10⁻⁷ to about 9×10⁻⁷ Torr to form the oxidized surface of the seedlayer.

17. The method according to claim 15, comprising depositing a chromium-containing underlayer.

18. The method according to claim 17, wherein the magnetic recording medium exhibits magnetic properties with an orientation ratio of less than about 1.1 and is characterized by the absence of any substantial superlinear noise behavior at a recording density of about 220 KFCI to about 280 KFCI.

19. The method according to claim 14, wherein the magnetic recording medium exhibits magnetic properties with an orientation ratio of about 1.0.

* * * * *